(12) United States Patent
Mikami

(10) Patent No.: US 9,291,483 B2
(45) Date of Patent: Mar. 22, 2016

(54) METER

(71) Applicant: Yazaki Corporation, Minato-ku, Tokyo (JP)

(72) Inventor: Hirobumi Mikami, Shimada (JP)

(73) Assignee: Yazaki Corporation, Minato-ku, Tokyo (JP)

(*) Notice: Subject to any disclaimer, the term of this patent is extended or adjusted under 35 U.S.C. 154(b) by 31 days.

(21) Appl. No.: 14/262,858

(22) Filed: Apr. 28, 2014

(65) Prior Publication Data

US 2014/0307414 A1    Oct. 16, 2014

Related U.S. Application Data

(63) Continuation of application No. PCT/JP2012/078409, filed on Oct. 26, 2012.

(30) Foreign Application Priority Data

Oct. 28, 2011  (JP) .................... 2011-237657

(51) Int. Cl.
*B60Q 1/00*  (2006.01)
*B60Q 1/26*  (2006.01)
(Continued)

(52) U.S. Cl.
CPC .............. *G01D 13/265* (2013.01); *B60K 37/02* (2013.01); *B60Q 3/004* (2013.01); *B60Q 3/044* (2013.01); *G01D 11/28* (2013.01); *B60K 2350/203* (2013.01)

(58) Field of Classification Search
CPC ..... G01D 11/28; G01D 13/22; G01D 13/265; B60K 37/02; B60K 2350/203; B60K 2350/2034; B60K 2350/2039; B60K 2350/2043; B60Q 3/002; B60Q 3/004; B60Q 3/005; B60Q 3/04; B60Q 3/042; B60Q 3/044
USPC ............. 362/23.09–23.11, 23.16–23.21, 489, 362/511, 543–545
See application file for complete search history.

(56) References Cited

U.S. PATENT DOCUMENTS

| 7,063,429 B2 | 6/2006 | Hirano et al. |
| 7,553,036 B2 | 6/2009 | Tsurumi |

(Continued)

FOREIGN PATENT DOCUMENTS

| CN | 1424705 A | 6/2003 |
| EP | 1407917 A2 | 4/2004 |

(Continued)

OTHER PUBLICATIONS

Search Report and Written Opinion for corresponding International Application No. PCT/JP2012/078409 mailed Jan. 28, 2013.

(Continued)

*Primary Examiner* — Jason Moon Han
(74) *Attorney, Agent, or Firm* — Banner & Witcoff, Ltd.

(57) ABSTRACT

A meter, comprising a meter unit, a visor arranged around the meter unit, a wiring board, a light source mounted on the wiring board, an annular light guiding member provided within the visor at a side of a light emitting surface of the light source so as to surround the meter unit, and a light emitting portion forwardly emitting light emitted by the light source and transmitted through the light guiding member and annually provided along an edge portion of the visor so as to surround the meter unit, wherein a protruding-length of the light guiding member is displaced to a longitudinal direction of the meter unit.

7 Claims, 4 Drawing Sheets

(51) Int. Cl.
  *G01D 13/26* (2006.01)
  *B60K 37/02* (2006.01)
  *G01D 11/28* (2006.01)
  *B60Q 3/04* (2006.01)
  *B60Q 3/00* (2006.01)

(56) References Cited

U.S. PATENT DOCUMENTS

2003/0103418 A1  6/2003  Hirano et al.
2004/0129197 A1  7/2004  Nakagawa et al.
2007/0186843 A1  8/2007  Tsurumi

FOREIGN PATENT DOCUMENTS

JP  2004-132756 A  4/2004
JP  2004-257749 A  9/2004
JP  2007-132757 A  5/2007
JP  2007-218694 A  8/2007

OTHER PUBLICATIONS

Jun. 23, 2015—(JP) Notification of Reasons for Refusal—App 2011-237657.
Jul. 2, 2015—(CN) Notification of the First Office Action—App 201280051531.2.

PRIOR ART

METER

CROSS REFERENCE TO RELATED APPLICATIONS

This application is a continuation of PCT application No. PCT/JP2012/078409, which was filed on Oct. 26, 2012 based on Japanese Patent Application (No. 2011-237657) filed on Oct. 28, 2011, the contents of which are incorporated herein by reference.

BACKGROUND OF THE INVENTION

1. Field of the Invention

The present invention relates to a meter including meter units, such as a speedometer and a tachometer, of a vehicle or the like.

2. Description of the Related Art

There are known meters mounted on conveyances such as vehicles, ships and airplanes (hereinafter referred to collectively as vehicles). FIGS. 4A and 4B illustrate an example of a meter of this kind (see PTL 1).

FIG. 4A is a perspective view of a conventional meter. FIG. 4B is an enlarged cross-sectional view of a main part of the meter. On the conventional meter 100, meter units 200, i.e., a tachometer 200c, a speedometer 200a, and a fuel meter 200d are arranged from the left side of FIG. 4A. On the circumference of each of the meter units 200, visors 300, a light guiding member 600, and a light emitting member 700 are formed annularly. In addition, the light guiding member 600 is arranged to be sandwiched by the visors 300 (see FIG. 4B). A light source 500 is placed at a rear end portion of the light guiding member 600. A reflecting surface 600S whose distal-end-portion takes a cross-sectionally triangular shape is provided at a front end portion of the light guiding member 600. In addition, the light emitting member 700 serving as a prism member cross-sectionally triangularly shaped to form a virtual image having an annular shape in front view of the meter is provided to be fit into the front end portion of the light guiding member 600.

With the above configuration, the manner of visually recognizing the light emitting member 700 differs between the case of turning off the light source 500 and that of turning on the light source 500. That is, in the case of turning off the light source 500, the light emitting member 700 can visually be recognized as a virtual image. On the other hand, in the case of turning on the light source 500, light irradiated from the light source 500 is substantially totally reflected on the reflecting surface 600S to the inside of the meter. Thus, the light emitting member 700 emits light which is irradiated only in the direction of the line of sight of a driver. Consequently, the quality of the daytime appearance of the meter is good. Even in night, there is substantially no possibility of reflecting, from the front glass of each of the meters, light emitted from the front end portion of the light guiding member 600. In addition, increase of the number of components can be suppressed. The flexibility of setting the arrangement of a meter device can be enhanced. The above techniques are disclosed in PTL 1.

CITATION LIST

Patent Literature

[PTL 1] JP-A-2004-257749

SUMMARY OF THE INVENTION

In the meter 100 described in PTL 1, the light emitting member 700 emits light reflected from the reflecting surface 600S of the light guiding member 600. However, the reflecting surface 600S and the light guiding member 600 are arranged to be sandwiched by the edge portions of the visors 300. Thus, the reflecting surface 600S and the light guiding member 600 are constrained by the appearances and the shapes of the visors 300. As illustrated in FIGS. 4A and 4B, the substantially circular light emitting member 700 is arranged only on the periphery of each of the meter units 200. Accordingly, the flexibility of designing the light emitting member is low. It is difficult to adapt the light emitting member to the appearance and the design of the entire meter 100. Particularly, there are demands for improving the display quality, such as stereoscopic visibility, of the meter units 200 because the vehicular meter 100 is arranged so as to catch a driver's eyes even while not used for the intended use of the meter. However, the meter 100 has a drawback in that the meter 100 doesn't follow the demands.

The present invention is accomplished in view of the above circumstances. An object of the present invention is to provide a meter capable of having the flexibility of determining the arrangement position of the light emitting portion, securing the desired luminance of the light emitting portion, and improving the display quality.

In order to achieve the foregoing object, a meter according to the present invention is featured in the following configures (1) to (4).

(1) A meter comprising a meter unit, a visor arranged around the meter unit, a wiring board, a light source mounted on the wiring board, an annular light guiding member provided within the visor at a side of a light emitting surface of the light source so as to surround the meter unit, and a light emitting portion forwardly emitting light emitted by the light source and transmitted through the light guiding member and annually provided along an edge portion of the visor so as to surround the meter unit, wherein a protruding-length of the light guiding member is displaced to a longitudinal direction of the meter unit.

(2) In a meter having the above configuration (1), a light-source-side surface of the light guiding member has a portion which corresponds to the light source, formed substantially flat.

(3) In a meter having the above configuration (2), a light-emitting-side surface of the light guiding member that is opposed to the light-source-side surface, is unevenly and continuously formed.

(4) In a meter having one of the above configurations (1) to (3), the light source includes a plurality of irradiating-light-sources irradiating the meter units and a plurality of emitting-light-sources for causing the light emitting portion to emit light, and the light guiding member is provided at a side of a light emitting surface of the emitting-light source.

With the above configuration (1), a meter can be provided, which is capable of regulating an amount of light incident upon the light emitting portion with the light guiding member, securing stable light emitting of the light emitting portion, allowing the protruding-length of the light guiding member to follow the position of the light emitting portion, and obtaining the stereoscopic visibility of the light emitting portion.

With the above configuration (2), light emitting from the light source is incident upon the light guiding member without waste. An amount of incident light is constant. Consequently, the optical design of the light guiding member is facilitated.

With the above configuration (3), the separation distance to the light emitting portion from the light guiding member can be regulated. Accordingly, an amount of light incident upon the light emitting portion can be regulated.

With the above configuration (4), the functions of the light source can be separated. Thus, the flexibility of design can be enhanced.

According to the present invention, a meter can be provided, which can freely arrange the light emitting portion according to the arrangement of the meter units while feeling a sense of depth, and can surely guide source-light from the light guiding member to the light emitting portion by following the shape in the depth direction of each visor, and can enhance the quality of appearance thereof, especially, in night and the like.

The present invention has briefly been described above. However, details of the present invention will further be clarified by reading thorough the following description of a best mode for carrying out the present invention with reference to the accompanying drawings.

DETAILED DESCRIPTION OF THE EXEMPLARY EMBODIMENTS

Hereinafter, a preferred embodiment of the present invention is described in detail with reference to the drawings.
<Specific Configuration>

A meter 10 which is an embodiment of the present invention is described with reference to FIG. 1.

Figure 1:
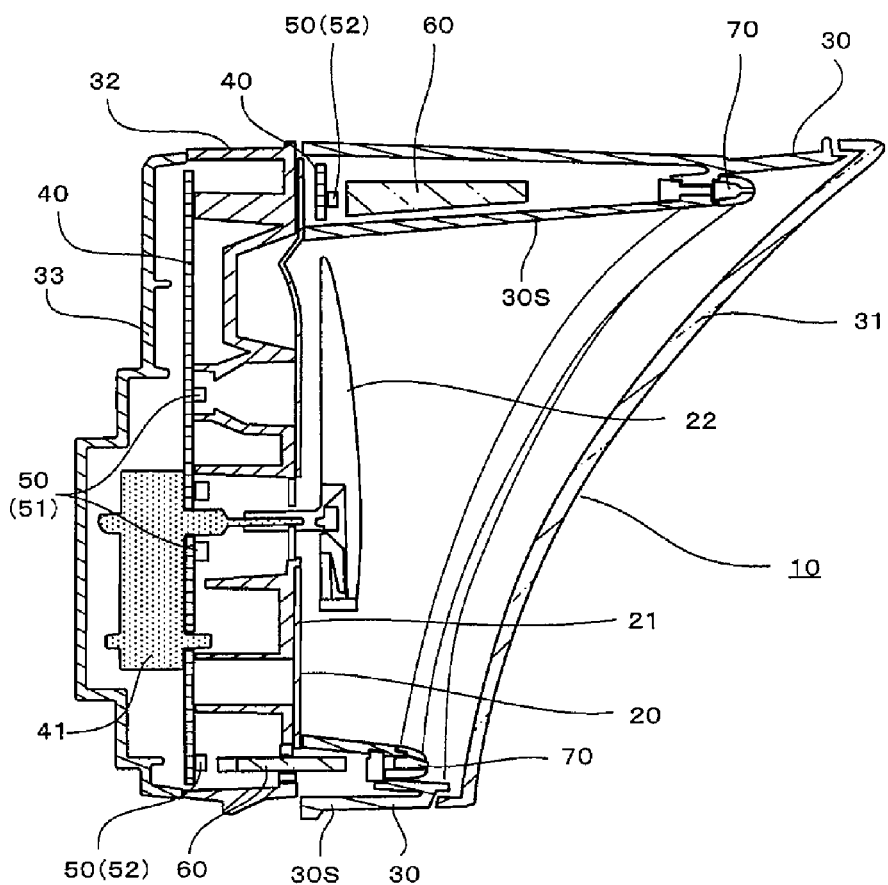
FIG. 1 is a cross-sectional view illustrating an embodiment of a meter according to the present invention.

FIG. 1 is a cross-sectional view illustrating an embodiment of the meter 10. The meter 10 is roughly configured by a plurality of meter units 20 arranged at a substantially central part of the meter 10, a visor 30 arranged on the outer circumference of the meter 10 to surround a dial 21 and a pointer 22 of each of the meter units 20, a front glass 31 configured to cover the front end of the visor 30, a case 32 placed at the rear end of the visor 30, and a rear cover 33 configured to cover the rear end of the case 32. The dials 21 are attached to the front portion (corresponding to the side of the visor 30) of the case 32, and the wiring board 40 is attached to the rear portion (corresponding to the side of the rear cover 33) of the case 32. An inner device 41 provided with a motor for rotatably driving the pointer 22 and the like, is attached to the back portion of the wiring board 40.

A light source 50 including a plurality of light emitting diodes (LEDs) is mounted on the wiring board 40. The light source 50 includes a plurality of irradiating-light-sources 51 irradiating the meter units 20 from back, and plural emitting-light-sources 52 for causing a light emitting portion 70, which will be described below, to emit light. In order to transmit light emitted from the emitting-light-sources 52 and to guide the light in a predetermined direction, a light guiding member 60 made of a light-permeable synthetic resin material, such as polycarbonate resin or acrylic resin, is provided to extend in a light emitting direction of the emitting-light-sources 52. The light guiding member 60 is placed within a leg 30S of the visor 30 and formed like a ring to surround the meter units 20. An annular light emitting portion 70 made of a light-permeable synthetic resin material, such as polycarbonate resin or acrylic resin, is provided to extend along an edge portion of the visor 30 to surround the meter units 20. Light emitted from the emitting-light-sources 52 is transmitted through the inside of the light guiding member 60 and guided to the light emitting portion 70.

Although the light guiding member 60 is arranged in the leg 30S of the visor 30, the light guiding member 60 is formed to protrude to the front (i.e., right-wardly in FIG. 1) in a longitudinal direction of the meter 10 from vicinity of the emitting-light-sources 52. The term "longitudinal direction" described herein designates a lateral direction in FIG. 1 and corresponds to the front-back direction of a vehicle or the like in a state in which the meter 10 is mounted on the body of the vehicle. In addition, the protruding length of the light guiding member 60 (i.e., the length of a protruded part of the light guiding member 60) varies with arrangement positions in the light guiding member 60. For example, an upper part and a lower part of the visor 30, which respectively correspond to an upward direction and a downward direction in FIG. 1, differ from each other in protruding-length. That is, at an upper portion of the visor 30, the light guiding member 60 is formed such that the upper part thereof protruded toward the light emitting portion 70 is long in protruding-length and somewhat thick. On the other hand, at a lower portion of the visor 30, the light guiding member 60 is formed such that the lower part thereof protruded toward the light emitting portion 70 is short in protruding-length and thin. The particular shape of the light guiding member 60 is described in detail with reference to FIG. 3.

Light emitted from the emitting-light-source 52 is collected with maintaining constant directionality while transmitted through the light guiding member 60. Then, the light is incident upon the light emitting portion 70 placed at a position spaced apart from a light emitting surface of the light guiding member 60. Attenuation of light in the light guiding member 60 can be suppressed as much as possible by adjusting the length and the thickness of the light guiding member 60. Simultaneously, the amount of light incident upon the light emitting portion 70 can be adjusted. A desired luminance of the light emitting portion 70 can be obtained.

Figure 2:
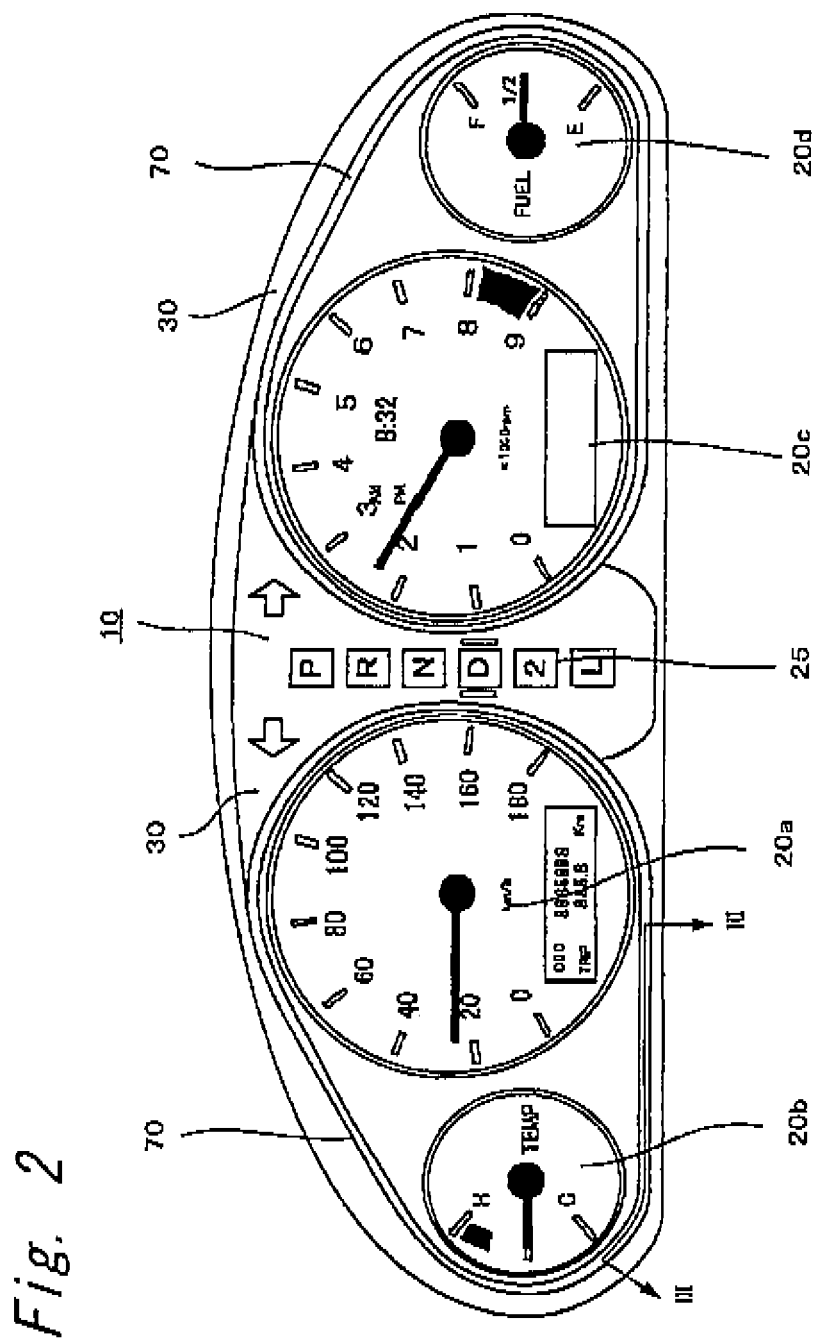
FIG. 2 is a front view illustrating the meter illustrated in FIG. 1.

One mode of arrangement of the light emitting portion 70 is described hereinafter with reference to FIG. 2. FIG. 2 is a front view illustrating the meter 10 according to the present invention.

In the meter 10, the plurality of meter units 20 are arranged. A speedometer 20a and a water temperature meter 20b are arranged at the left side (corresponding to the left side of FIG. 2) of a shift position indicator 25. A tachometer 20c and a fuel meter 20d are arranged at the right side (corresponding to the right side of FIG. 1) of the shift position indicator 25. At the left side of the shift position indicator 25, the light emitting portion 70 according to the present invention is provided to surround the speedometer 20a and the water temperature meter 20b. At the right side of the shift position indicator 25, the light emitting portion 70 according to the present invention is provided to surround the tachometer 20c and the fuel meter 20d. That is, the light emitting portion 70 is provided not only on periphery of a single meter 20. As indicated in the description of the one mode according to the present invention, a plurality of meter units 20 can be surrounded by the light emitting portion 70. The light emitting portion 70 can appropriately be arranged according to requests concerning the design of the meter.

The visor 30 is a component that implements the appearance-shape of the meter 10. The appearance-shape of the meter 10 is an important factor of the design. Simultaneously, the light emitting state of the light emitting portion 70 that is provided along an edge of the visor 30 is an important factor of the design. Variation of the shape, such as the protruding-length, of the light guiding portion 60 with locations is not required to be constrained by the appearance-shape and the cross-sectional shape in the depth direction of the visor 30. Stable emitting of light from the light emitting portion 70 can be secured. The quality of display required by the meter 10 can be enhanced.

Figure 3:
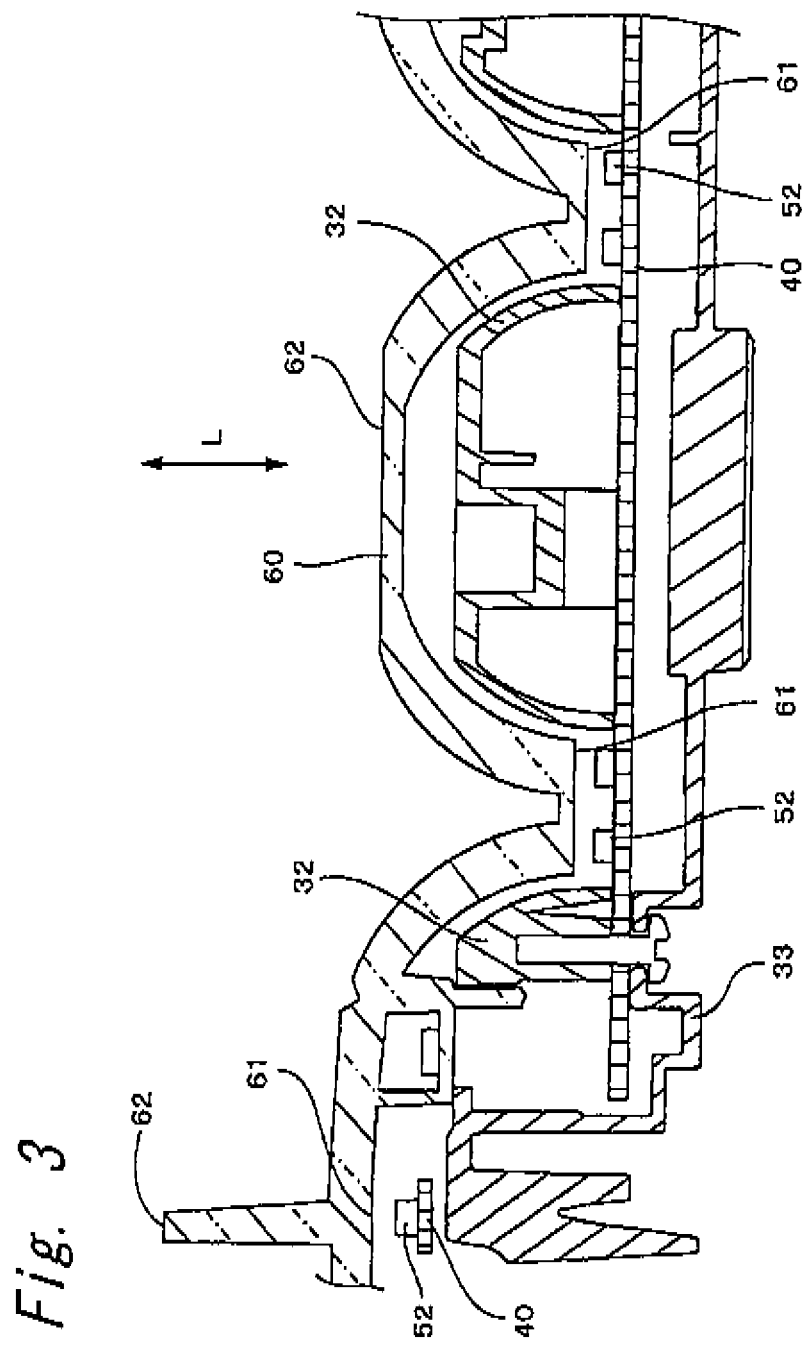
FIG. 3 is a cross-sectional view taken on line III-III shown in FIG. 2.
Figure 4A:
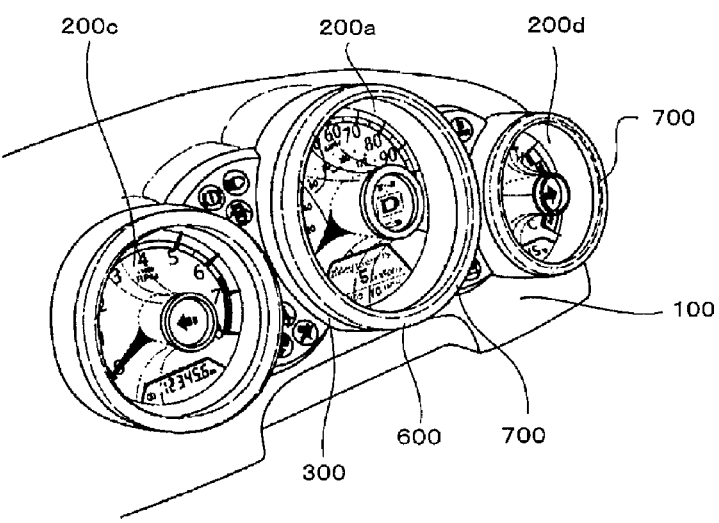
FIG. 4A is a perspective view of a conventional meter.
Figure 4B:
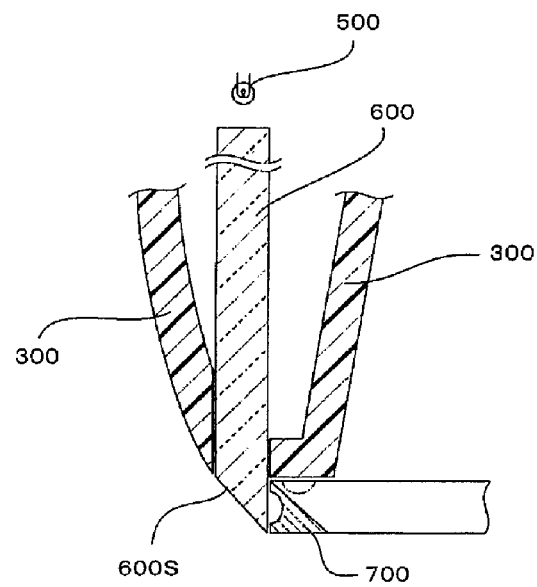
FIG. 4B is an enlarged cross-sectional view of a main part of the meter.

An embodiment of the light guiding member 60 is described in detail hereinafter with reference to FIG. 3. FIG. 3 is a cross-sectional view taken on line III-III shown in FIG. 2.

The light guiding member 60 varies in protruding-length with locations in a longitudinal direction (see an arrow L in FIG. 3). That is, the light guiding member 60 is formed such that the cross-section of the light guiding member 60 protrudes like a chevron in the vicinity of a central part of FIG. 3, and that the cross-section thereof is concavely shaped at both sides of the central part of FIG. 3. It is clearly seen from FIG. 3 that there is variation of the length of the cross-section of the protruded part of the light guiding member 60, which is calculated by setting the emitting-light-source 52 as a base point. If a surface of the light guiding member 60, which faces the emitting-light-sources 52 mounted on the wiring board 40, is defined as a light-source-side surface 61 of the light 40, and another surface of the light guiding member 60 is defined as a light-emitting-side surface 62 of the light guiding member 60, the light-source-side surface 61 is formed substantially flat to facilitate the incidence of light emitted from the emitting-light-source 52 upon the light guiding member 60, while the light-emitting-side surface 62 is formed as a continuous concave-convex surface to adjust an amount of emitting light of the light guiding member 60. The light guiding member 60 receives light emitted from the plural emitting-light-sources 52, guides the received light to a desired location, and emits the received light to the light emitting portion 70 from the light-emitting-side surface 62.

<Outline of the Present Invention>

The meter 10 according to the embodiment of the present invention has at least one or more meter units 20, and includes the visor 30 arranged around the meter units 20, the case 32, the rear cover 33, and the wiring board 40. The light source 50 including a plurality of LEDs and the like is mounted on the wiring board 40. The annular light guiding member 60 is provided at the side of the light emitting surface of the light source 50 to be placed in the visor 30 and surround the meter units 20. The light emitting portion 70 for forwardly emitting light emitted by the light source 50 and transmitted through the light guiding member 60 is provided like a ring along an edge portion of the visor 30 to surround the meter units 20. The light guiding member 60 is featured in that the protruding-length varies in the longitudinal direction of the meter 10.

With this configuration, the meter 10 can be provided, which can adjust an amount of light incident upon the light emitting portion 70 with the light guiding member 60 and secure stable emitting of light from the light emitting portion 70, and which can adapt the protruding-length of the light guiding member 60 to follow the position of the light emitting portion 70, and can obtain the stereoscopic visibility of the light emitting portion 70.

In the meter 10 according to the embodiment of the present invention, the light-source-side surface 61 of a part of the light guiding member 60, which corresponds to the light source 50, is formed substantially flat. With this configuration, light emitting from the light source 50 is incident upon the light guiding member 60 without waste, so that an amount of incident light is constant. Thus, the optical design of the light guiding member 60 can be facilitated.

In addition, in the meter 10 according to the embodiment of the present invention, a light-emitting-side surface 62 of the light guiding member 60 that is opposed to the light-source-side surface 61, is unevenly and continuously formed. With this configuration, the separation distance to the light emitting portion 70 from the light guiding member 60 can be regulated. Accordingly, an amount of light incident upon the light emitting portion 70 can be regulated.

In the meter 10 according to the embodiment of the present invention, the light source 50 includes a plurality of irradiating-light-sources 51 for irradiating the meter units 20, and plural emitting-light-sources 52 for causing the light emitting portion 70 to emit light, and that the light guiding member 60 is provided at the side of the light emitting surface of each emitting-light-source 52. With this configuration, the functions of the light source 50 can be separated. Consequently, the flexibility of design can be enhanced.

Incidentally, the present invention is not limited to the above embodiment. Appropriate modification, improvement and the like can be made. The materials, shapes, dimensions, numerical values, modes, numbers, arrangement locations, and the like of each component of the above embodiment are optional and not limited to specific ones, as long as the present invention can be implemented.

Although the embodiment has been described in detail by separating the light source 50 into the irradiating-light-sources 51 and the emitting-light-sources 52, the irradiating-light-sources 51 may also serve as the emitting-light-sources 52. Similarly, the emitting-light-sources 52 may also serve as the irradiating-light-sources 51.

Although the stable emitting of light from the light emitting portion 70 has been described in detail, the concept "stable emitting of light" includes not only emitting light whose luminance is stable, but emitting light which is uniform in luminance. In addition, the "stable emitting of light" includes emitting light such that the stereoscopic visibility obtained by, e.g., somewhat darkening an upper part of each meter 20 and somewhat lighting up a lower part thereof is stable.

Emitting light from the visor 30 is enabled using a molded article made of a material of the light guiding member as the visor 30, similarly to the light emitting portion 70. In addition, the uniformity in luminance of emitting light can be enhanced using a light-permeable material or a light diffusing material as the material of the light guiding member.

What is claimed is:

1. A meter comprising:
    a meter unit;
    a visor arranged around the meter unit;
    a wiring board;
    a light source mounted on the wiring board;
    an annular light guiding member provided within the visor at a side of a light emitting surface of the light source so as to surround the meter unit, wherein the light guiding member is formed to protrude to the front in a longitudinal direction of the meter from a vicinity of the light source; and
    a light emitting portion forwardly emitting light emitted by the light source and transmitted through the light guiding member and annularly provided along an edge portion of the visor so as to surround the meter unit,
    wherein a protruding-length of the light guiding member varies with arrangement positions in the light guiding member.

2. The meter according to claim 1, wherein a light-source-side surface of the light guiding member has a portion which corresponds to the light source, formed substantially flat.

3. The meter according to claim 2, wherein a light-emitting-side surface of the light guiding member that is opposed to the light-source-side surface, is continuously formed and varies in length in the longitudinal direction along a circumferential direction of the meter unit.

4. The meter according to claim 1, wherein the meter includes a plurality of irradiating-light-sources irradiating the meter unit and a plurality of emitting-light-sources for causing the light emitting portion to emit light, and the light guiding member is provided at a side of a light emitting surface of each of the emitting-light-sources.

5. The meter according to claim 1, wherein at least a portion of the light guiding member is disposed entirely within the visor in the longitudinal direction.

6. The meter according to claim 5, wherein the light source is disposed within the visor.

7. The meter according to claim 1, wherein the visor extends further in the longitudinal direction of the meter than the light guiding member.

* * * * *